Dec. 15, 1964    J. A. JOHNSON    3,161,153
BRIDGING STRUCTURE FOR TRAILER CARRYING RAILWAY CARS
Filed Oct. 19, 1960    3 Sheets-Sheet 1
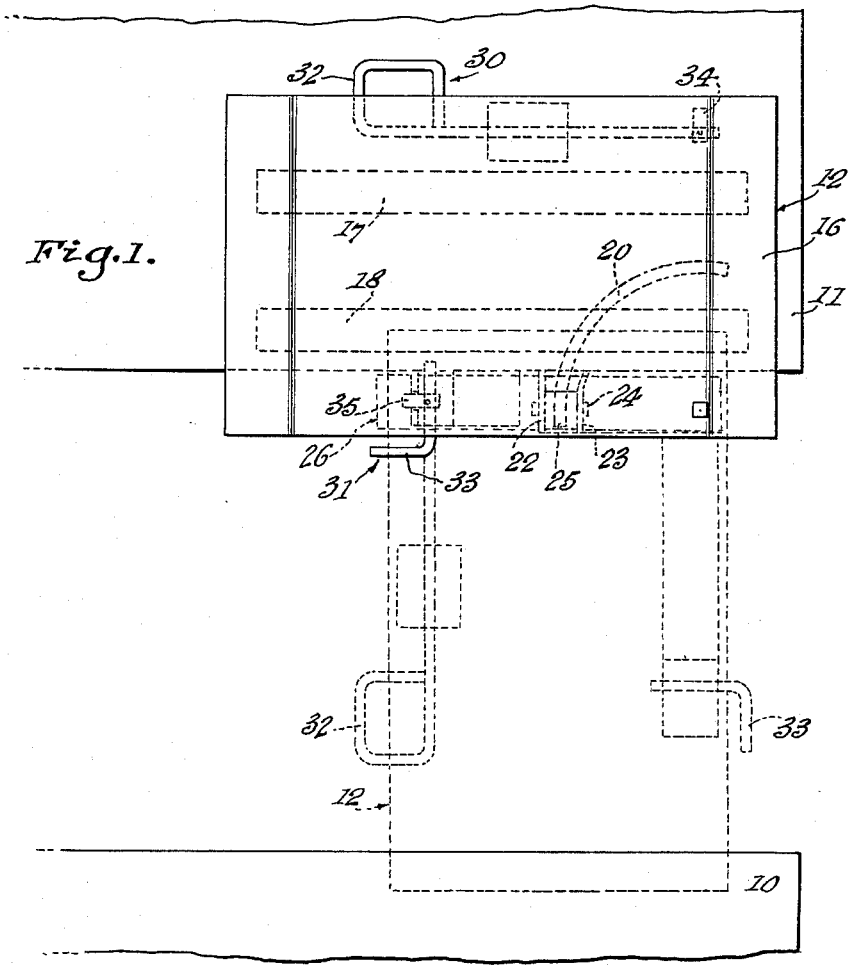
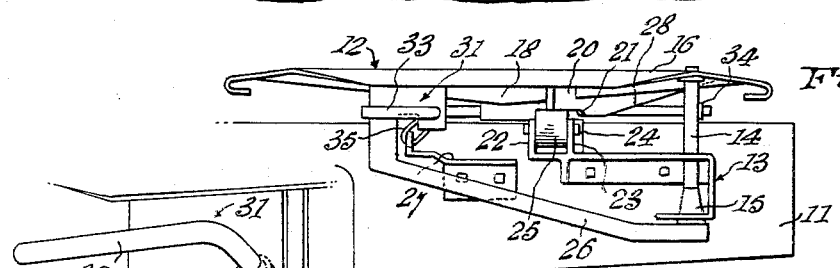
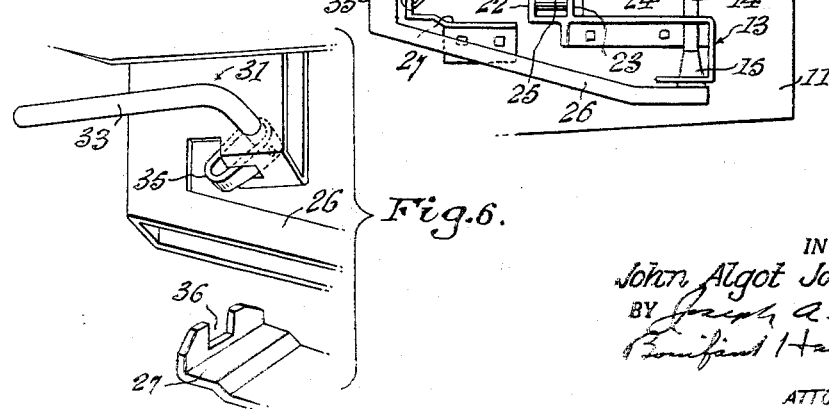
INVENTOR.
John Algot Johnson
BY
ATTORNEYS Dec. 15, 1964   J. A. JOHNSON   3,161,153
BRIDGING STRUCTURE FOR TRAILER CARRYING RAILWAY CARS
Filed Oct. 19, 1960

INVENTOR.
John Algot Johnson
BY
ATTORNEYS

Dec. 15, 1964   J. A. JOHNSON   3,161,153
BRIDGING STRUCTURE FOR TRAILER CARRYING RAILWAY CARS
Filed Oct. 19, 1960   3 Sheets-Sheet 3

INVENTOR.
John Algot Johnson
BY
ATTORNEYS

United States Patent Office

3,161,153
Patented Dec. 15, 1964

3,161,153
BRIDGING STRUCTURE FOR TRAILER
CARRYING RAILWAY CARS
John A. Johnson, 9 Sheridan Drive, Short Hills, N.J.
Filed Oct. 19, 1960, Ser. No. 63,700
17 Claims. (Cl. 105—458)
(Granted under Title 35, U.S. Code (1952), sec. 266)

The invention described herein may be manufactured and used by or for the Government for governmental purposes without the payment of any royalty thereon.

This invention relates to improved bridging structure for spanning the gaps between adjacent ends of consecutive railway flat cars assembled to receive highway trailers.

The method of transportation wherein highway trailers are secured on flat cars, for railway transportation over long distances, is generally referred to as "piggy-back" operation and has been in use for a number of years. In carrying out this operation a number of railway flat cars are assembled on a railway siding and coupled together to constitute a string of cars, which will form all or a part of a train when a locomotive is attached. Each car is usually provided with a stand for connection to the fifth wheel structure of a highway trailer mounted on the particular car and these stands can be lowered so that trailers can pass freely over them, or raised and locked in raised position to secure the fifth wheel structures of the associated trailers. A wheel carried ramp is connected to one end car of the string, or ramps may be connected respectively to each of the two end cars, if desired. The highway trailers are normally backed on to the flat cars for loading and pulled off of the flat cars for unloading. Special tractors have been developed for handling the trailers under the incident condition of minimum deviation from the travel path and accurately positioning the trailer fifth wheel structures for engagement by the car mounted stands.

When railway freight cars are coupled together there are spaces of standard dimension (approximately three feet in width) between adjacent ends of consecutive cars, these spaces having, among other purposes, the purpose of avoiding contact between adjacent car ends when a train moves around a trackway curve.

In order for the highway trailers and the trailer moving tractor to move across the gaps between adjacent ends of a string of "piggy-back" flat cars, it is necessary to span these gaps with suitable bridging structures. At the beginning of the history of the "piggy-back" operation, loose, flat plates were used with the ends of the plates resting on the end portions of consecutive flat cars. This practice, however, was soon discontinued since the plates were difficult to handle, were frequently lost and were seldom present in sufficient quantity at the location where they were needed. The resultant procedure was to attach the bridging plates in some manner to the freight cars. The attaching means could not be rigid since the height of the decks of freight cars above the rails is not uniform and the plates are frequently inclined from one car to the other. Also, if the plates were left in operative position they would interfere with railroad personnel in operating the couplings between cars and would frequently be caught between the ends of adjacent cars and damaged while the train of cars was negotiating railway curves. The bridging plates thus had to be mounted in a suitable manner, as by hinges, for freedom of vertical movement of the free ends of the plates. In addition to having the free or distal end vertically movable, the plates also had to be movable between an operative position in which they would span the corresponding gaps between adjacent car ends and an inoperative position in which they are out of the way of railroad operating personnel, and in which they cannot be caught between adjacent car ends or curves and damaged.

The plates were hinged at one end to the associated car by hinges having horizontal axes substantially perpendicular to the longitudinal center line of the car. These plates are movable from their gap spanning position through either an arc of 180°, in which case they rest in inoperative position on the deck of the car, or through an arc of 90°, in which case, when in inoperative position, they stand substantially upright on the corresponding ends of the car deck and are braced or latched in position. In the first case the bridging plates use an unjustifiable amount of car space and in the second case they have a tendency to become unlatched and fall between the two adjacent car ends. In both cases the plates are difficult to move, since their weight is in the order of two hundred pounds each, and present a continuous hazard to railway operating personnel. It will be noted that, with a horizontally hinged plate, the free end has to be lifted directly upward unassisted by any mechanical advantage in the usual case. Such a lift strains the capacity of one man since the position of the plate and the environmental ground obstructions prevent a direct lift.

Some effort has been made to produce a bridging plate which is slidably mounted in the associated car so that it moves horizontally between its operative and inoperative positions and does not have to be lifted. This construction, however, not only requires too much otherwise usable car space, but necessitates such extensive changes to the car construction and is so expensive to construct that it has not gone into extensive use.

In view of the above considerations, it is a major object of the present invention to provide an improved bridging plate construction in which the bridging plate can be moved between its operative and its inoperative position without being directly lifted.

A further object resides in the provision of an improved bridging plate construction which incorporates a mechanical advantage for raising the bridging plate for clearance purposes, so that one man can move the plate between its operative and its inoperative position by a small effort.

A still further object resides in the provision of an improved bridging plate construction so arranged that the plate is moved between its operative and inoperative positions by a push or a pull rather than a lift.

An additional object resides in the provision of an improved bridging plate assembly in which the plate turns about a substantially vertical axis between its operative and inoperative positions and is locked in both positions by manually releasable locks.

Yet another object resides in the provision of an improved bridging plate assembly which is strong and durable in construction, economical to manufacture and which can be mounted on an existing railway flat car with little or no modification of the existing car structure.

Other objects and advantages will become apparent from a consideration of the following specification and the appended claims in conjunction with the accompanying drawings wherein:

FIG. 1 is a top plan view of one embodiment of a bridging plate assembly and fragmentary end portions of the two associated railway flat cars, the bridging plate being shown in full lines in its inoperative position and in broken lines in its operative position;

FIG. 2 is an end elevational view of the bridging plate assembly shown in FIG. 1;

FIG. 6 is a fragmentary perspective view of a detail of the bridging plate assembly of FIG. 1 showing the plate locking mechanism;

Figure 7:
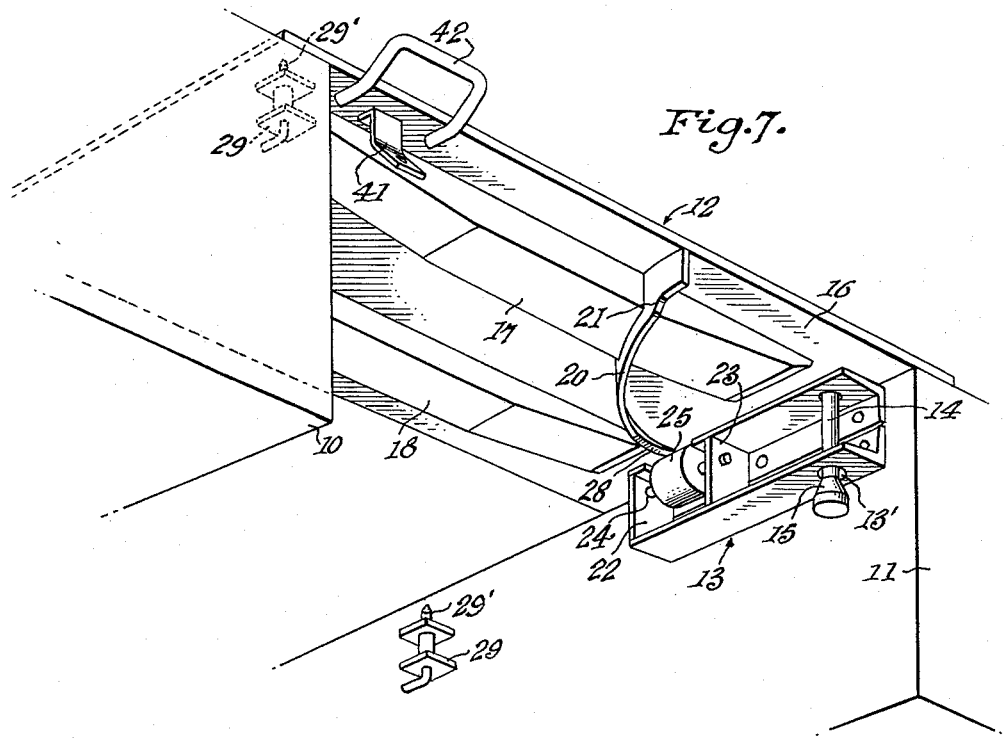
Figure 8:
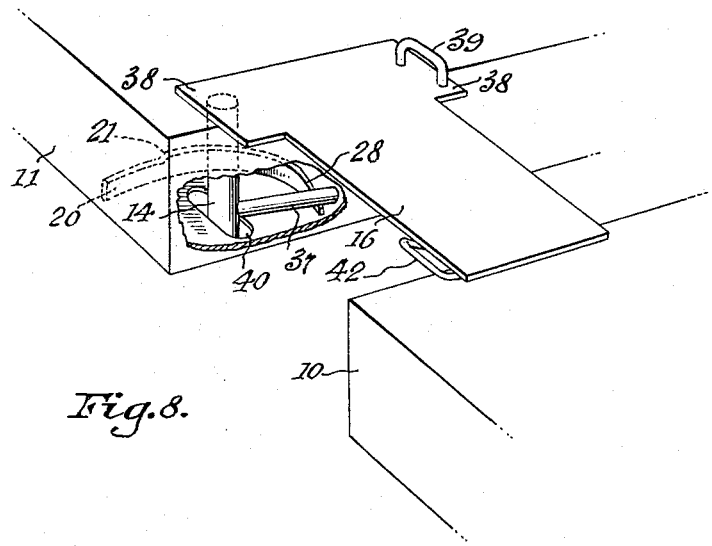

FIG. 7 is a perspective view of another form of construction embodying the principles of the present invention, the view looking upwardly from beneath, the bridge plate being shown in operative position bridging the intervening space between successive railroad flat cars; and FIG. 8 is a perspective view of a further form of construction embodying the principles of the present invention but employing a variation in shape of the bridging plate and mounting means therefor.

With continued reference to the drawings, the numerals 10 and 11 indicate adjacent end portions of two coupled railway flat cars showing the gap between adjacent end portions, which is to be spanned by the bridging plate or extension plate structure, when the plate is in its operative position. A railway flat car normally has an end structure in the form of a unitary iron or steel structure, either a casting or a welded up steel fabrication, which has adequate strength and rigidity for the attachment thereto of the mounting portion of the bridging plate assembly.

The plate structure illustrated in FIGS. 1 through 7, as generally indicated at 12, includes a flat metal plate 16 of elongated, rectangular shape having a length sufficient to span the gap between the adjacent ends of the coupled flat cars and to overlap the end portions of both flat cars a predetermined amount, and a suitable reinforcing structure. As illustrated, the reinforcing structure comprises two hollow members 17 and 18 of channel shaped cross-section secured to the undersurface of the plate 16 and extending longitudinally of the plate in spaced apart and parallel relationship to each other. These members are positioned with their open sides against the undersurface of the plate and are tapered in depth at their opposite ends so that at their end portions, the undersurfaces of these reinforcing members are inclined downwardly away from the adjacent ends of the plate.

A mounting bracket, generally indicated at 13, is positioned against the end surface of one of the cars, the car 11 as shown in FIGS. 1 through 7, near one side of the flat car and is rigidly secured to the end structure of the flat car, by suitable means, such as by being bolted, riveted or welded to the end structure. This bracket 13 may be conveniently provided as a piece of structural channel iron of the proper dimensions or as a specially formed forging or casting and is positioned to constitute a bracket of substantially channel shape in cross section. The web portion of the channel shaped bracket is disposed against the outer surface of the car end structure and the flanges project outwardly from the car end structure in substantially horizontal position. Near the end of the bracket adjacent the side of the car at which the bracket is mounted the flange portions of the bracket are provided with aligned bearing apertures, one of which is indicated at 13' in FIGS. 5 and 7, and a pivot pin 14 extends through and is journalled in these bearing apertures.

Figure 5:
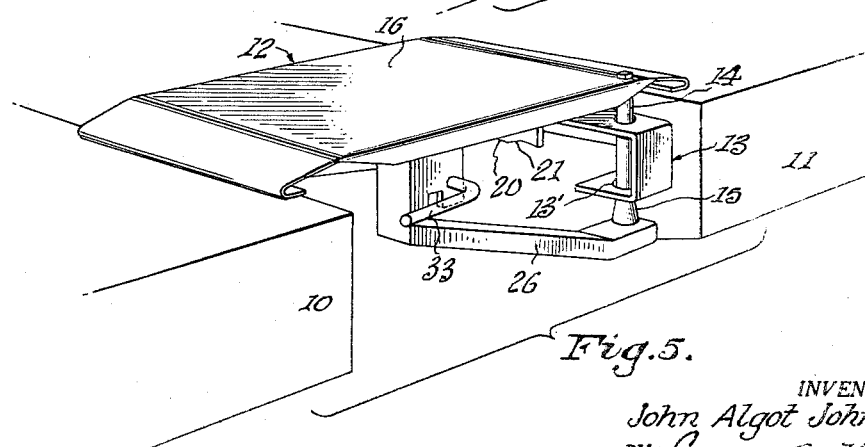
FIG. 5 is a perspective view of the bridging plate assembly of FIG. 1 in its operative position.

The plate element 16 of the bridging plate structure 12 is rigidly secured near one of its corners to the upper end of the pin 14. This corner of the bridging plate is the one nearest the adjacent side of the associated flat car when the plate is in its operative position, as illustrated in FIGS. 1, 5 and 7. With this arrangement, the plate structure 12 is swingable through an arc of approximately 90° between its operative position, in which the plate extends outwardly from the end of the associated flat car with its outer edge substantially parallel to the upper side edge of the flat car, and its inoperative position in which the plate extends transversely across the portion of the front end of the flat car adjacent the bracket 13.

Since the reinforcing members 17 and 18 project below the undersurface of the plate 16, they would interfere with moving the plate structure 12 from the operative to the inoperative position of this structure if the plate were simply swung around the axis of the pivot pin 14. Means are therefore provided for gradually lifting the plate during the swinging of the plate from the operative to the inoperative position an amount sufficient to allow the reinforcing members 17 and 18 to clear the upper edge of the corresponding end structure of the flat car. In the forms of the invention shown in FIGS. 1 through 7 this means takes the form of a curved cam 20 secured at its upper edge to the undersurface of the plate 16 and extending downwardly from the plate, with its center of curvature substantially coincident with the rotational axis of the pivot pin 14, and a roller abutment 25 carried by the mounting bracket 13 and engaging the bottom edge of the cam 20. The roller 25 is mounted on a roller shaft 24, the ends of which are received in apertures provided in end walls 22 and 23 of a boxlike structure formed on the upper flange of the mounting bracket 13 at the end of the bracket remote from the pin 14 as in FIG. 3. These walls are substantially vertically disposed so that the roller is rotatable on a substantially horizontal axis. In the modification shown in FIG. 7, the end walls 22 and 23 are disposed between the flanges of the bracket 13. The cam 20 has at its end adjacent roller 25, when the bridging plate structure is in its operative position, an inclined ramp 28. This ramp inclines downwardly from the corresponding end of the cam and extends a sufficient distance along the cam that a substantial portion of the swinging movement of the plate is used in raising the plate by the bearing of this ramp on the upper surface of the roller 25 as the plate is swung from its operative toward its inoperative position. The length of the ramp is such, however, that before the reinforcing member 18 reaches a position at which it would interfere with the top edge of the flat car end structure 11 the plate structure 12 will have been raised sufficiently so that this reinforcing member will completely clear the end structure of the associated flat car.

Figure 4:
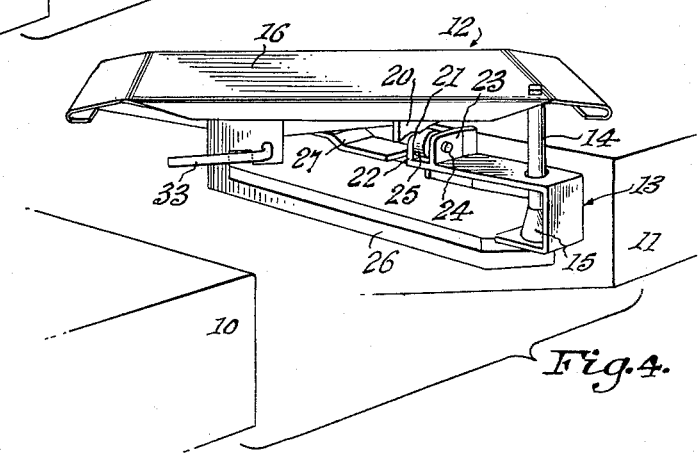
FIG. 4 is a perspective view of the bridging plate assembly of FIG. 1 at a position intermediate its inoperative and operative positions.

At its end remote from the ramp formation 28 the cam 20 is provided with a notch 21, as shown for example in FIGS. 4, 7 and 8, in its bottom edge. When the bridging plate structure 12 is in its fully inoperative position, the roller 25 moves into the notch 21 to releasably lock the plate structure in the inoperative position.

It will be seen from the above description that the plate structure 12 does not have to be bodily lifted by the operator at any time but is raised the necessary small amount for clearance by the action of the cam ramp 28 on the abutment roller 25 as the plate is swung about the axis of the pin 14. This ramp and roller arrangement provides a mechanical advantage which relieves the operator from any excessive lifting effort in moving the bridging plate structure from one position to the other.

Since the deck height of various flat cars above the rails may vary over a range of several inches, it has been found necessary to provide some means which will permit the bridging plate structure 12 to incline upwardly or downwardly from its car connected end, when in its operative position. In the arrangements illustrated in FIGS. 1 through 7, the pin receiving aperture 13' in the bottom flange of the bracket 13 is enlarged or elongated in the direction transversely of the flange. This permits the pin 14 to tilt and the free end of the bridging plate structure 12 to move upwardly or downwardly. It is essential, however, that the plate should not be downwardly inclined at the time the free end of the plate is in position to move over the upper edge of the car end structure as the plate is being moved to its inoperative position. To avoid this condition a conically shaped terminal formation 15 is provided on the lower end of the pin 14 and, as the plate structure 12 and pin 14 are raised by the cam ramp 28 as the plate is being moved to its inoperative position, this conical formation enters the enlarged aperture 13' and centers the pin in this aperture thereby bringing the surface of the plate to a substantially horizontal condition.

With the above described arrangement, when the plate is swung through the arc between its operative and inoperative positions, the entire upper surface of the plate is maintained substantially horizontal by the pin and bracket connection which supports the plate on the end structure of the flat car. The plate, however, does not move in a single horizontal plane, since it is raised and lowered by the cam and roller mechanism, but does stay within a space between two spaced apart planes both of which are substantially parallel to the plane of the car deck and which are separated a distance less than the length or width (the minimum plan dimension) of the plate.

In addition to the longitudinally extending reinforcing members 17 and 18, the plate of the embodiment shown in FIGS. 1 through 6 is further reinforced by an arm or brace 26 which extends from the lower end of pin 14 to the under surface of the plate near the corner at the same side and at the free end of the plate. This brace has, at its end remote from pin 14, a rectangular terminal formation 31 comprising two spaced apart and substantially parallel walls depending perpendicularly from the under side of plate 16. The walls of the formation 31 are provided with aligned apertures receiving a lock shaft 33 which extends perpendicularly through the walls and is bent to provide an angularly extending end portion which serves as a handle.

The embodiment illustrated in FIGS. 1 through 6 includes a radially extending latch formation 35 secured on shaft 33 between the walls of formation 31 and is engageable in a notch 36 provided in a tongue 27 extending from a bracket secured to the end structure of the associated flat car. The formation 35 can be moved into and out of notch 36 by manually rotating shaft 33 and serves to positively lock the plate structure in its inoperative position, as shown in FIG. 2. The handle portion of shaft 33 may serve as a hand grip for moving the plate structure between the operative and inoperative positions of this structure or a fixed handle may be secured to the plate 16 in proper location to serve as a hand grip for moving the plate. A second lock shaft 30 is positioned along the under side of plate 16 near the inner edge of this plate. This shaft is rotatably mounted in a flanged sleeve secured to the under side of plate 16 and has at its end nearest the free end of plate 16 a loop formation 32 providing a handle. A radially projecting formation 34 is secured to shaft 30 near the other end of the shaft and this formation is engageable in the notch 36 of bracket tongue 27 when plate structure 12 is in operative position, as shown in FIG. 1, to positively lock the plate in this position.

Figure 3:
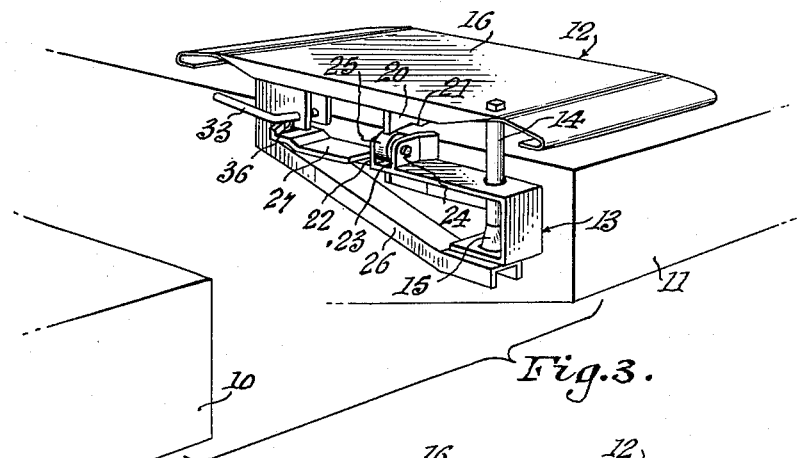
FIG. 3 is a perspective view of the bridging plate assembly of FIG. 1 in its inoperative position.

FIGS. 3, 4 and 5 particularly show the two terminal positions and an intermediate position of this embodiment of the bridging plate. In the inoperative position shown in FIG. 3 the plate structure 12 is parallel to but slightly above the deck surface of the associated car, being supported by the cam 20 resting on roller 25. This permits the plate to be started toward its operative position without dragging on the car deck and with a minimum of frictional resistance.

In the intermediate position shown in FIG. 4 the plate is still supported by the cam 20 riding on roller 25 and the conical formation 15 on the bottom end of pin 14 is pulled up into and fills the oversize lower bearing aperture 13' so that the pin is firmly held and supports plate 16 in horizontal position.

In the operative position of the embodiment shown in FIG. 5, the plate rests at its ends on the end portions of the deck surfaces of the two cars 10 and 11 so that it can effectively support the loads of trailer wheels passing over it. The plate may be reinforced at its ends by recurving the end portions downwardly as is particularly shown in FIG. 2. In this position the pin 14 is lowered relative to the bracket 13 so that the terminal formation 15 is moved out of the enlarged pin receiving aperture in the lower bracket flange and the plate is free to tilt within limits sufficient to accommodate it to the differences in deck heights of standard railway flat cars. While some frictional resistance will be encountered in moving the plate away from its operative position, this resistance is moderate since it is only that incident to the relative sliding movement of two flat metal surfaces. In the embodiment shown in FIG. 7, a bail-shaped handle 42 is secured to plate 16 and projects outwardly from the side edge of the plate nearest to the bolt 14 near the end of this side edge remote from the bolt. A striker plate 41 secured to the plate 16 extends outwardly and downwardly from the same edge of the plate adjacent to the handle 42.

In FIG. 7, the plate 16 is shown in its operative position spanning the gap between two adjacent cars. When the plate is in this position, a vertically disposed pin 29' extends at its upper end into an aperture in plate 16 to lock the plate in position. The pin 29' is mounted slidably in a bracket 29 secured in the end structure of car 10 in a location such that the pin extends through the top surface of the car in the portion of such top surface overlapped by the plate 16.

When it is desired to swing the bridge plate 16 of FIG. 7 to its inoperative position, the pin 29' is retracted and manual force is applied to the handle 42 to swing the bridge plate inwardly clockwise about the bolt 14. The cam track means 20 riding on roller 25 raises the bridge plate 16 so that the reinforcements 17 and 18 clear the top end edge of the car platform as the bridge plate 16 is moved to its inoperative position within the limits of the plane of the car. When the bridge plate 16 has been moved to its inoperative position, shoulder 21 of the cam track means drops behind the roller 25 to hold the bridge plate 16 in this position.

In the structural embodiment shown in FIG. 8, the previously-described roller operating on the cam track means 20 is replaced by an arm 37 which extends outwardly from pivot pin 14, which, in this form of construction, is located in an opposite corner of the bridge plate 16 with respect to the location thereof shown on the previous views. In this form of plate construction shown by FIG. 8, cam track means 20 are relocated in conformity with the above-noted shifting of the pivot pin 14 and such means is shown as being disposed in clockwise direction. The shape of the bridge plate 16 also has been modified from the showing of the preceding views, there being an operating handle 43 mounted on a side of the plate adjacent to the free end of the plate, so that to prevent excessive projection of the handle 43 beyond the overall periphery of the plate, the body of the plate has been reduced from the top of the plate in an amount represented by opposite flanges 38 adjacent to the top of the plate, the reduction in width of the plate being compensated by this provision of the operating bail handle 43 on the end corner of the plate. As has been described before, the pivot pin 14 is at the center of curvature of the cam track means 20, the bridge plate 16 being horizontally rotatable on the pivot pin 14 in directions opposite to the rotational direction of the bridge plate in the embodiments heretofore described. A bail-shaped locking pin 39 is placed oppositely to the pivot pin 14 on the opposite top flange 38. In the embodiment shown in FIG. 8, the bridge plate 16 in its retracted position extends flatly transversely across the end of the flat car, while, by reason of its vertical pivoted axis, the plate is swung through a horizontal arc between its retracted (or inoperative) position and its usual normal bridging position during the trailer loading operation.

In the construction of the invention as shown in FIG. 8, it is desirable, as has been pointed out above, to raise the bridge plate 16 through a short distance to clear possible obstructions in horizontally rotating the plate between bridging and retracted positions. This is accomplished by the cam track means 20 arranged between the lower edge of the side and the end sill of the flat car. With the bridge plate 16 in either the retracted or the loading position, the cam track means 20 lowers the plate to prevent any tendency for movement. Additionally, a vertically sliding locking pin 39 is provided to secure the plate in either position.

As in previously described forms of the construction, the lower bearing 40 of the pivot pin 14 as is shown in FIG. 8, is elongated in the fore and aft direction to provide for vertical movement of the free end of the plate to accommodate bridging between cars having some variation in deck height. For example, bridging from a 42-inch deck height to a 48 or 36-inch deck height is possible by slotting the lower bearing hole 40 (assuming a 9-inch bearing spacing) approximately two inches on centers.

When the plate 16 is in its retracted position, it fits, as aforesaid, under the rear of a trailer and also to a considerable extent, the plate slides flatly under the rear wheels of the trailer, thus minimizing the unusable space on the flat car.

The present embodiments are for purposes of illustration only and are not to be taken as limiting or restricting the invention, the scope of which is to be measured by the scope of the appended claims, any changes or modifications which fall within the scope of the claims being included in the invention.

I claim:

1. In combination with a railway flat car having a rigid end structure, a bridging plate assembly comprising a bracket rigidly mounted on the car end structure, a pin journalled in said bracket for turning movements about a substantially vertical axis, a bridging plate mounted near one end on the upper end of said pin and swingable about the rotational axis of said pin between an operative and an inoperative position, and means acting between said bracket and said plate for raising said plate sufficiently to clear said car end structure when said plate is moved from its operative to its inoperative position.

2. A bridging plate assembly adapted to be applied to one end of a railway flat car for spanning the gap between adjacent ends of coupled flat cars comprising a mounting bracket element adapted to be secured to the car, a pin supported by said bracket, a bridging plate element mounted on said pin for swinging movements about an axis positioned to intersect a horizontal plane, an abutment carried by one of said elements, and a ramp carried by the other of said elements and engaging said abutment for raising and lowering said plate element when this element is swung in opposite directions.

3. A bridging plate assembly adapted to be applied to one end of a railway flat car for spanning the gap between adjacent ends of two coupled cars comprising a mounting bracket adapted to be secured to one end of a flat car, a plate, connecting means supporting said plate on said bracket and providing freedom of swinging movements of said plate between limiting positions while maintaining said plate substantially horizontal, and means acting between said plate and said bracket for gradually raising said plate as the plate is swung in one direction between said limiting positions and gradually lowering said plate when the plate is swung in the opposite direction between said limiting positions, said connecting means providing limited freedom of up and down movements of said plate.

4. A bridging plate assembly for spanning the gap between adjacent ends of coupled railway flat cars comprising a mounting bracket adapted to be secured to a flat car at one end of the car, a reinforced bridging plate having a length sufficient to overlap adjacent ends of two coupled cars, connecting means supporting said plate on said bracket for freedom of swinging movement of said plate between an inoperative limiting position and an operative limiting position while maintaining said plate substantially horizontal, and means acting between said plate and said bracket effective to raise said plate for clearance purposes as said plate is swung from its operative to its inoperative position.

5. A bridging plate assembly for spanning the gap between adjacent ends of coupled railway flat cars comprising a mounting bracket adapted to be secured to a flat car at one end of the car, a reinforced bridging plate having a length sufficient to overlap adjacent ends of two coupled cars, connecting means supporting said plate on said bracket for freedom of swinging movement of said plate between an inoperative limiting position and an operative limiting position while maintaining said plate substantially horizontal, and means acting between said plate and said bracket effective to raise said plate for clearance purposes as said plate is swung from its operative to its inoperative position and releasably lock said plate in its inoperative position.

6. A bridging plate assembly for spanning the gap between adjacent ends of coupled railway flat cars comprising a mounting bracket adapted to be secured to a flat car at one end of the car, a reinforced bridging plate having a length sufficient to overlap adjacent ends of two coupled cars, connecting means supporting said plate on said bracket for freedom of swinging movement of said plate between an inoperative limiting position and an operative limiting position while maintaining said plate substantially horizontal, and means acting between said plate and said bracket effective to raise said plate for clearance purposes as said plate is swung from its operative to its inoperative position, said connecting means being effective to provide a limited freedom of tilting movement of said plate when said plate is in its operative position.

7. A bridging plate assembly for spanning the gap between adjacent ends of coupled railway flat cars comprising a mounting bracket adapted to be secured to a flat car at one end of the car, a reinforced bridging plate having a length sufficient to overlap adjacent ends of two coupled cars, connecting means supporting said plate at one end on said bracket for freedom of swinging movement of said plate between an inoperative limiting position and an operative limiting position while maintaining said plate substantially horizontal, means acting between said plate and said bracket effective to raise said plate for clearance purposes as said plate is swung from its operative to its inoperative position, and manually actuated lock means carried by said plate for releasably locking said plate in its operative position.

8. A bridging plate assembly for spanning the gap between adjacent ends of coupled railway flat cars comprising a mounting bracket adapted to be secured to a flat car at one end of the car, a reinforced bridging plate having a length sufficient to overlap adjacent ends of two coupled cars, connecting means supporting said plate on said bracket for freedom of swinging movement of said plate between an inoperative limiting position and an operative limiting position while maintaining said plate substantially horizontal, and means acting between said plate and said bracket effective to raise said plate for clearance purposes as said plate is swung from its operative to its inoperative position.

9. An extension plate assembly comprising a bracket adapted to be secured to a fixed support, a plate of generally rectangular shape positioned with its upper surface substantially in a horizontal plane, means supporting said plate at one end on said bracket for swinging movements of the opposite end of said plate through an arc of substantially ninety degrees while maintaining said plate in substantially horizontal position, and means acting between said bracket and said plate for bodily raising said plate when said plate is swung in one direction and bodily lowering said plate when said plate is swung in the opposite direction.

10. An extension plate assembly comprising a bracket adapted to be secured to a fixed support, a plate of generally rectangular shape positioned with its upper surface substantially in a horizontal plane, means supporting said plate at one end on said bracket for swinging movements of the opposite end of said plate through an arc of substantially ninety degrees while maintaining said plate in substantially horizontal position, and means acting between said bracket and said plate for bodily raising said plate when said plate is swung in one direction and bodily lowering said plate when said plate is swung in the opposite direction, said means acting between said bracket and said plate including an inclined ramp which requires a swinging movement of said plate through the major portion of said arc to fully raise or lower said plate.

11. In a piggyback railroad flat car employed for rail transportation of highway vehicles such as truck-trailers, the car having a substantially flat deck and provided with means on an end of the car for mounting a bridge plate for spanning an intervening space between adjacent ends of successive cars for enabling loading wheeled vehicles thereon, the improvements which comprise mounting bracket means on the end of the car, said bracket being provided with vertically spaced openings for receiving a pin, a substantially vertical pivot pin extending through said openings in the mounting bracket means, the lowest of said openings being enlarged and said pin having a lower end disposed in the enlarged bottom opening in the mounting bracket means, a bridge plate secured to the pin for horizontal rotation on the pin between an inoperative retracted position flat on the deck of the car and transversely thereof and an extended operative position flatly bridging an intervening space between adjacent ends of successive cars, the plate having an approximately flat upper surface, arcuate cam track means mounted beneath the plate, cam-actuating means beneath the plate engaging the cam track means and coacting therewith for imparting a lifting action to the plate during movement of the plate between inoperative and operative positions of the plate responsive to selected rotation of the plate, cooperating locking means on the car and plate for receiving latching means for the plate, latching means on the plate for engaging the locking means to secure the plate selectively in retracted inoperative position and extended operative position, means on the bottom end of the pivot pin operative in the enlarged bottom opening in the mounting bracket means for maintaining said plate substantially horizontal in its inoperative position, and handle grip means on the plate for effecting substantially flat horizontal rotation of the plate between retracted inoperative position of the plate resting flatly transversely of the car on the deck thereof and flatly extended operative position spanning an intermediate end space between adjacent ends of successive cars.

12. A construction as defined in claim 11, wherein the bridge plate is provided with spaced load-bearing reinforcing means underside thereof.

13. A construction as defined in claim 11, wherein the bridge plate is connected with the pivot pin adjacent to an upper corner of the plate enabling rotation of the plate in one direction, with respect to said pivot pin, into extended operative position, the cam track means beneath the plate also extending arcuately in the same direction.

14. A construction as defined in claim 11, wherein the cam track actuating means include a roller mounted in the mounting bracket means and in engagement with the arcuate cam track means secured to the plate on its underside.

15. A construction as defined in claim 11, wherein the cam track actuating means include a cam-engaging arm mounted in the pivot pin and projecting therefrom into engagement with the cam means.

16. A construction as defined in claim 11, wherein the enlarged bottom opening in the mounting bracket means is elongated in an approximately fore-and-aft direction with respect to the car, and the means on the bottom end of the pivot pin operating in the enlarged bottom opening in the mounting bracket means is a downwardly diverging conical sleeve enclosing the bottom end of the pivot pin.

17. A construction as defined in claim 11, wherein the cooperating locking means on the car and plate include a locking bracket mounted on the car for receiving latching means on the plate, the latching means being multiple lever-actuated latching means, one of which is adapted to engage the locking bracket to secure the bridge plate in retracted inoperative position, and another of the latching means being adapted to engage the locking bracket to secure the plate in extended operative position.

References Cited by the Examiner
UNITED STATES PATENTS

| | | | |
|---|---|---|---|
| 2,099,288 | 11/37 | Allen | 105—368.5 |
| 2,372,574 | 3/45 | Haynes | 14—71 |
| 2,788,751 | 4/57 | Russell | 105—368 |
| 3,003,167 | 10/61 | Smith | 14—71 |

LEO QUACKENBUSH, *Primary Examiner.*

JAMES S. SHANK, *Examiner.*